Aug. 4, 1964 M. W. WIDENER 3,143,603

MAGNETIC RECORD HEAD ASSEMBLY

Filed Aug. 29, 1960 2 Sheets-Sheet 1

MAURICE W. WIDENER
INVENTOR.

BY Nathan N. Kallman

ATTORNEY

MAURICE W. WIDENER
INVENTOR.
BY Nathan N. Kallman
ATTORNEY 3,143,603
Patented Aug. 4, 1964

3,143,603

MAGNETIC RECORD HEAD ASSEMBLY

Maurice W. Widener, San Jose, Calif., assignor to Ampex Corporation, Redwood City, Calif., a corporation of California Filed Aug. 29, 1960, Ser. No. 52,577
7 Claims. (Cl. 179—100.2)

This invention relates to magnetic recording apparatus and in particular to an improved magnetic record transducing assembly.

In presently known magnetic recording systems which employ a magnetic record head with a single gap and a single source of bias signal, there is a loss of signal information notably in the short wavelength or high frequency range. This occurs because the bias signal current is adjusted for maximum sensitivity at long wavelengths to avoid excessive distortion at low frequencies. However, at very short wavelengths this bias current is usually excessive thereby causing erasure and extreme losses of information signal at high frequencies, especially when using slow speed recording and reproducing. The extent of these losses is determined by the magnitude of the bias signal, the thickness of the layer of magnetic material onto which the information is recorded, and the width of the single record head gap traversed by the layer of magnetic material, among other things. Such loss of information signal reduces the high fidelity performance of magnetic tape apparatus.

The loss of information signal begins to be prominent when the signal wavelength is substantially close to the thickness of the magnetic oxide coating of the tape. For example, with an audio tape having a coating of .0004 inch thickness, difficulties are experienced at a frequency of about 30,000 cycles per second when employing a recording tape speed of 15 inches per second. When using a recording speed of 1⅞ inches per second, by way of example, the difficulties arise in the 4–5 kilocycle region.

For a record head, the gap should be long enough to achieve deep flux penetration into the tape for recording the long wavelengths and yet short enough to obtain sharp gradients of high frequency bias flux at the tape surface adjacent to the gap for effectively recording the short wavelengths or high frequency signals. To record the high frequency signals, the size of the record gap may be reduced. However, if the gap size is reduced in order to provide better resolution of high frequencies, the signals recorded at low frequencies are distorted and reduced in amplitude. The result is a deterioration in dynamic range or signal-to-noise ratio.

A solution for enabling the recording of both the short wavelength and long wavelength portions of an information signal during one pass of the magnetic tape is described in copending application Serial No. 10,347, filed February 23, 1960, now Patent No. 3,070,670, issued December 25, 1962. This copending application teaches the use of a magnetic transducer assembly employing a plurality of closely spaced gaps and having biasing means for applying separate bias signals to each gap to provide thereby optimum recording of a frequency spectrum. In one embodiment, the gaps are preferably spaced closely so that any time delay in recording between the gaps becomes negligible. However, in a magnetic transducer assembly having closely spaced gaps which are magnetically coupled, there may be a reduction in amplitude of the composite recorded signal at various signal frequencies as a result of interference between the signal frequency portions recorded at each gap. Such destructive interference occurs if the signal portions being recorded are out of phase so that nulls appear at several signal frequencies.

An object of this invention is to provide a magnetic transducing device which affords an improved signal response over a broad range of frequencies of an information signal being recorded.

Another object of this invention is to provide an improved magnetic transducing device wherein a single biasing means is employed in conjunction with a plurality of gaps to provide optimum recording of an information signal.

Another object is to provide a magnetic transducing record device having at least three gaps of predetermined widths disposed in a predetermined arrangement for high fidelity magnetic recording.

According to this invention, a magnetic record transducing device comprises a magnetic core, coupled to a single biasing means, having at least three nonmagnetic gaps of different widths closely spaced in series and closely coupled magnetically. The various widths of the gaps enable the recording of an information signal over a broad range of frequencies. The spacing of the gaps is such that the effect of nulls which appear at various frequencies of an information signal as a result of the close magnetic coupling of any two gaps is negated by the reinforcement of the information signal at such null frequencies. Such reinforcement occurs by the transducing action of a third closely coupled gap which is of predetermined dimension and spacing relative to the other two closely spaced co-acting gaps.

In a particular embodiment of the invention, a first record gap is made relatively much larger than a closely spaced second gap whereby each of these magnetically coupled gaps provides optimum recording of a particular portion of a signal information frequency band. An intermediate gap has a width which is substantially the geometric mean of the widths of the first and second gaps, and is spaced by magnetic spacers from such first and second gaps. Each of the magnetic spacers is at least as wide as the widest adjacent gap. The gap widths and the spacing between the recording gaps are predetermined to provide a minimum of nulls and reinforcement of the signal being recorded at such frequencies at which interference or nulls may appear.

The invention will be described in greater detail with reference to the drawing in which.

Figure 1:
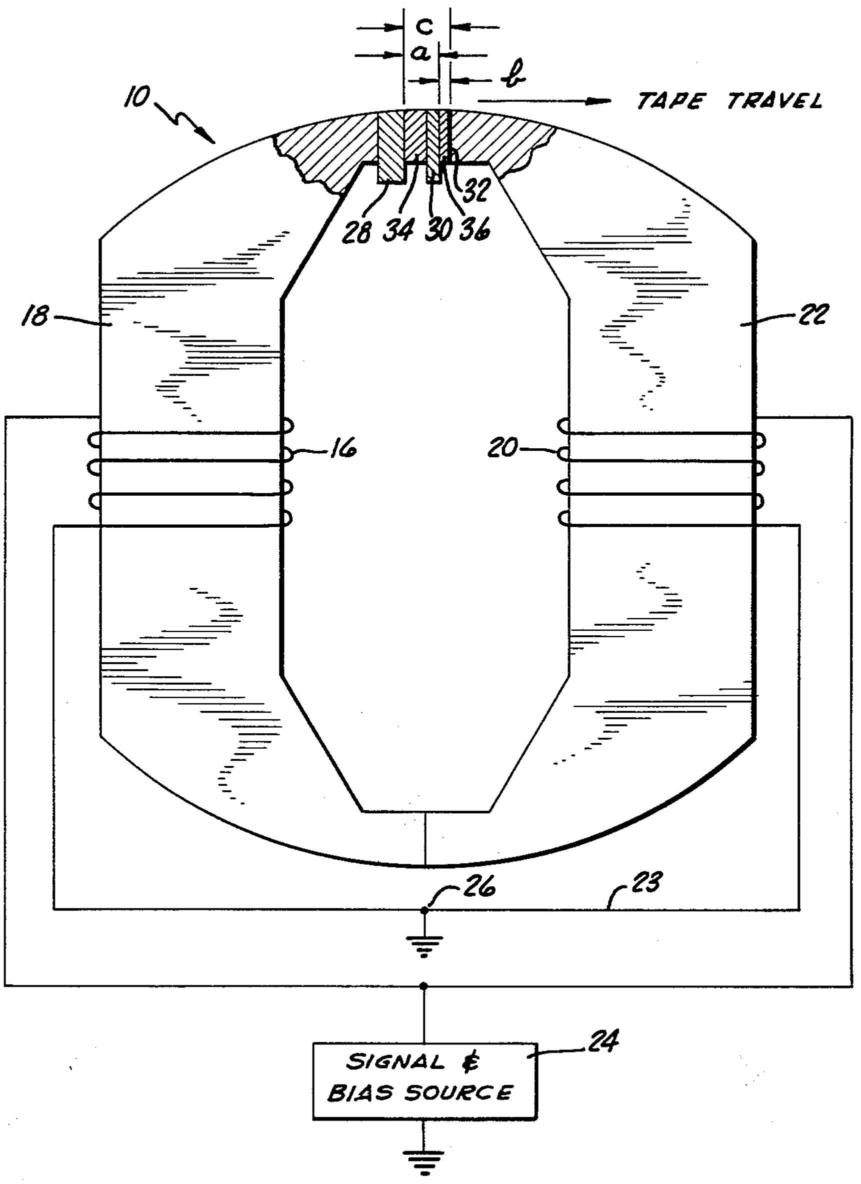
FIGURE 1 is a schematic view of a magnetic record transducing assembly, in accordance with an embodiment of the invention.
Figure 2:
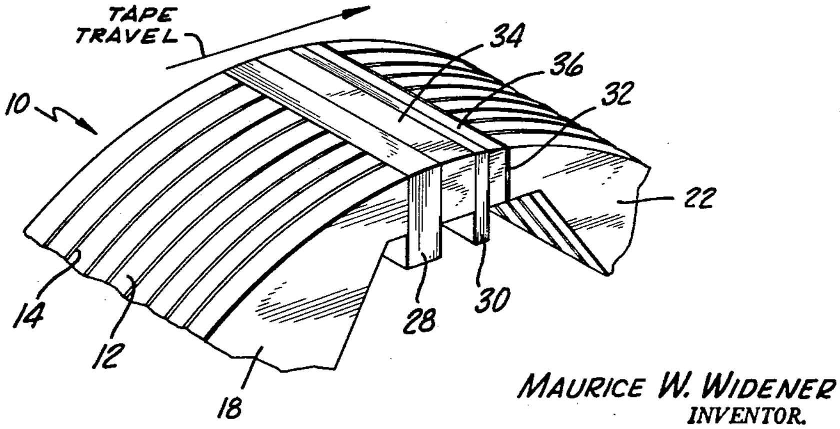
FIGURE 2 is an enlarged perspective sectional view of the upper portion of the magnetic record head assembly shown in FIGURE 1.

As shown in FIGURES 1 and 2, a magnetic record transducing assembly comprises a magnetic core 10 formed from a stack of substantially identical magnetizable laminations 12 which may be ferromagnetic material, such as Permalloy for example. Interspersed between each of the thin magnetizable laminations 12 are electrically insulating spacers 14 shaped similarly to the laminations 12, which may be generally annular in form. An energizing coil 16 is wound on one leg 18 of the core 10, and a second energizing coil 20 is coupled to a second leg 22 of the core and in series with the first energizing coil 16 for developing magnetic flux fields at nonmagnetic gaps formed in the core 10. One end of each of the coils 16 and 20 is coupled together through an electrical lead 23, whereas the other end of each coil is coupled to a source of alternating current bias signal 24. The signal source provides bias current to the energizing coils 16 and 20, the value of the bias current being determined in accordance with the gap widths and the spacing between the gaps, inter alia. An information input signal to be recorded may be applied at a terminal 26 coupled to the lead 23 and coils 16 and 20 in additive relation to the bias current signal. As the information signal varies, the magnetic flux at each of the nonmagnetic gaps is varied accordingly. The information signal is thereby recorded on a magnetic medium which crosses the gaps, as is well known.

In accordance with an embodiment of this invention, three nonmagnetic gaps 28, 30 and 32 having different gap widths are disposed in tandem along a narrow section of the core 10. The gaps 28, 30 and 32 are arranged in the direction of travel of a magnetic medium or tape so that the gap 28 having the largest width for recording the long wavelength portion of an information signal contacts the tape first. Thereafter the tape passes the intermediate gap 30 and the small gap 32 in that order.

In operation, a recording medium or magnetic tape is moved longitudinally past the gaps 28, 30 and 32 and is magnetized in accordance with the magnitude of the field adjacent to each gap. The tape picks up the long wavelength signals at the large gap 28 and then as it moves past the small gap 32, picks up the short wavelength signals without any appreciable erasure of the long wavelength signals. The delay during the recording of the long wavelength and short wavelength signal information, which may be in the order of about 50 microseconds between the signal recorded at the gap 28 and the signal recorded at the gap 32, is not significant when considering conventional audio recordings which normally include reverberant and resonant tones. It is understood that a complete information signal may be defined by the long and short wavelength portions, and that a continuous wavelength spectrum may be represented thereby.

To construct a magnetic transducing record head for at least three nonmagnetic gaps of different widths in series in accordance with the invention, the widths of the first and the last gaps 28 and 32 are chosen to provide optimum recording in respective desired frequency ranges when employing a given tape speed and a fixed alternating current bias signal. For example, the width of the large gap 28 is selected so that optimum recording of the long wavelength-low frequency portion of the information signal to be recorded is provided. Similarly the width of the small gap 32 is fixed so as to provide optimum recording for the short wavelength-high frequency portion of the information signal to be recorded. Then the smallest distance (hereinafter referred to as "$c$") between the trailing edges of the first gap 28 and the last gap 32 is fixed, based upon the established widths of the gaps 28 and 32 which are individually suitable for their respective recording frequency ranges.

The width of the intermediate gap 30 is then set to be the geometric mean of the widths of the adjacent surrounding gaps 28 and 32. Thus, $$g_2=\sqrt{g_1 g_3} \tag{1}$$

where $g_1$ is the width of gap 28, $g_2$ is the width of gap 30, and $g_3$ is the width of gap 32.

Magnetic spacers 34 and 36 are sandwiched coextensively between the nonmagnetic gaps and serve to establish discrete magnetic flux fields adjacent to each of the gaps. The width of the magnetic spacer 34 located between the first gap 28 and the intermediate gap 30 should be at least as wide as the largest adjacent gap, which is the first gap 28 in this instance. Similarly, the spacer 36 interposed between the intermediate gap 30 and the last gap 32 should be at least as wide as the intermediate gap 30, which is the larger of the two adjacent gaps.

To provide a strong supporting structure between the legs 18 and 22 of the core 10, a wafer type or sandwich arrangement may be employed using nonmagnetic materials for the gaps 28, 30 and 32 alternately with magnetic material for the spacers 34 and 36. For example, the first large gap 28 may be formed from a thin copper sheet, the intermediate gap 30 may comprise a strip of beryllium copper, and the last small gap 32 may be formed by evaporating an oxide film onto the adjacent surface of the core leg 22 or the spacer 36, or both. The spacers 34 and 36 may be made from a mu metal, such as Permalloy for example.

With the addition of a third gap, there are essentially three pairs of gaps which provide sets of null frequencies. If the null sets are selected so that there are no coincident null frequencies, then the effect of a given null may be minimized by the action of reinforced recording provided by the remaining two sets which are so arranged that maximum response is obtained at the given null frequency. It is apparent that by varying the widths of the spacers 34 and 36, the intermediate gap 30 is displaced with reference to the other gaps 28 and 32, thereby changing the points of coincidence of null frequencies.

To determine the desired widths of the spacers 34 and 36, or the displacement of the intermediate gap 30 with respect to the distance between the first gap 28 and the last gap 32, it is necessary to establish the magnetic crossover points at which interference or null coincidence would occur during recording. The magnetic crossover point defines the frequency at which the recorded amplitudes of the long wavelength and short wavelength signals experience maximum erasure which results when a signal recorded by means of the short wavelength gap 32 is 180° out of phase with the signal recorded by means of the long wavelength gap 28.

The frequencies at which cancellation occurs may be defined by $$f=\frac{(2n-1)v}{2d} \tag{2}$$

where $n$ is an integer, $v$ is the speed of the tape in inches per second, $d$ is the distance between the trailing edges of the two recording gaps 28 and 32, and $f$ represents the frequencies in cycles per second. This Equation 2 defines the frequencies at which odd half-wavelength cancellation appears.

If it is assumed that the first magnetic spacer 34 should be at least as wide as the first gap 28, and that the second spacer 36 should be at least as wide as the intermediate gap 30, the minimum total length $c$ represented by the distance from the trailing edge of the first gap 28 to the trailing edge of the last gap 32 becomes $$c=g_1+g_2+g_2+g_3=g_1+2\sqrt{g_1 g_3}+g_3$$

If smaller values of $c$ are employed the gaps will be too close to provide well defined magnetic flux fields. On the other hand, much larger values for $c$ will make it more difficult to select proper spacings of the gaps because more null frequencies will be introduced in the signal band being recorded.

Figure 3:
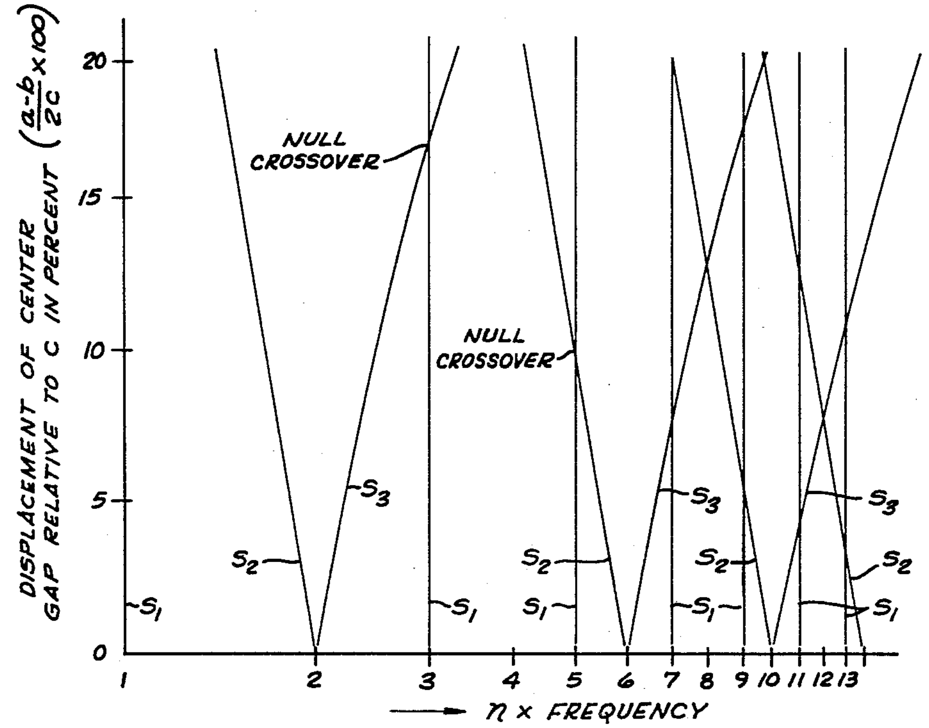
FIGURE 3 is a nomogram illustrating the occurrence of nulls, and the coincidence of such nulls for different spacings of a set of three nonmagnetic gaps with relation to frequency.

If we select $c$ to give a series of nulls, $S_1=1, 3, 5, 7, 9 \ldots (2n-1)$ kc., then "$a$," which represents the distance between the trailing edges of the first and intermediate gaps 28 and 30, or "$b$," which represents the distance between the trailing edges of the intermediate and small gaps 30 and 32, may be freely chosen. If $a$ is made equal to $b$, then the second and third sets of nulls $S_2=S_3=2, 6, 10, 14, 18 \ldots 2(n-1)$ kc. If $a$ is increased slightly thereby decreasing $b$, the null series for $a$ is moved to a set of lower frequencies, and the series for $b$ is moved to a set of higher frequencies. If these frequencies are then plotted on a log frequency scale against the relative displacement of the intermediate gap 30, a chart such as shown in FIGURE 3 is obtained. The vertical frequency lines correspond to $S_1$, the negatively sloping curves correspond to $S_2$, and the positively sloping lines correspond to $S_3$. The points of intersection of these three sets of lines and curves represent points of null coincidence which are to be avoided in the construction of a magnetic record transducing assembly.

To employ the nomogram of FIGURE 3 for constructing a magnetic record transducing assembly in accordance with the invention, a percentage displacement for the intermediate gap 30 is selected by projecting a horizontal line, and selecting that percentage at which the least coincidence of nulls occurs. For example, according to the chart of FIGURE 3, a 9% displacement from the center point $$\frac{c}{2}$$

relative to the total distance $c$ is preferable, whereas a 17% displacement is not too desirable. It is noted that in the higher octaves, more null coincidence is present. However, by establishing the distance between the trailing edges of the gaps as small as possible, there will be a reduction in such null coincidence in a desired frequency range.

In one embodiment of a magnetic transducing assembly constructed in accordance with the invention, the following dimensions and values were used for recording an audio signal frequency spectrum at 1⅞ inches per second:

| | | |
|---|---|---|
| $g_1$ (**28**) | microinches | 500 |
| $g_2$ (**30**) | do | 175 |
| $g_3$ (**32**) | do | 60 |
| Spacer (**34**) | do | 500 |
| Spacer (**36**) | do | 250 |
| A.C. Bias (**24**) | ampere turns | 2.64 |

It is noted that a preferred distance ($c$) between the trailing edges of the first gap 28 and the small gap 32 is about .001 inch for audio spectrum recording.

It is understood that the scope of the invention is not limited to the above values, which are shown by way of example. It is also noted the transducing assembly of this invention may comprise more than three gaps. Furthermore, although the invention may have been described with relation to audio frequency recording, the inventive concept is also applicable for the recording of other signal frequency ranges.

There has been described herein a magnetic record transducing assembly having at least three nonmagnetic record gaps in tandem of predetermined widths and spacing relative to each other, employing a single bias signal source for recording signal information with a minimum of loss in the long and short wavelength regions of the information signal band to be recorded.

What is claimed is:

1. A magnetic record transducing assembly for recording an information signal on a movable medium comprising: a single magnetic core; at least one set of nonmagnetic gaps formed in said core, each set having three gaps disposed in series, said three gaps having diminishing widths in the direction of travel of said magnetic medium; a single biasing means coupled to said core; and magnetic spacers between each of said gaps, each of said spacers being at least as wide as the widest adjacent gap.

2. A magnetic transducing assembly comprising: a single magnetic core having at least three nonmagnetic gaps of different widths disposed in series in the direction of travel of said magnetic medium; a single biasing means coupled to said core; and magnetic spacers located between said gaps, each of said magnetic spacers being at least as wide as the widest gap adjacent to said spacer.

3. A magnetic transducing assembly comprising: a single magnetic core; a single biasing means coupled to said core; first, second and third nonmagnetic gaps within said core spaced in tandem, the width of said first gap being greater than the width of said third gap, the width of said second gap being the geometric mean of the widths of said first and third gaps; a first magnetic spacer between said first and second gaps, said first spacer having a width greater than said first gap; and a second magnetic spacer between said second and third gaps, said second spacer having a width greater than said second gap.

4. A magnetic transducing assembly comprising: a single magnetic core; a single biasing means coupled to said core; first, second and third nonmagnetic gaps within said core spaced in tandem and closely coupled magnetically, the width of said first gap being approximately 500 microinch, the width of said second gap being approximately 175 microinch, the width of said third gap being approximately 60 microinch; a first magnetic spacer between said first and second gaps having a width of at least 500 microinch; and a second magnetic spacer between said second and third gaps having a width of at least 175 microinch.

5. A magentic transducing assembly comprising: a single magnetic core, a single biasing means coupled to said core, a wafer comprising a series of alternate nonmagnetic gaps, and magnetic spacers formed in a portion of said core, said gaps having diminishing widths in the direction of motion of said magnetic medium, each of said spacers being at least as wide as the widest adjacent gap.

6. A magnetic transducing assembly comprising: a single magnetic core providing a flux path; a wafer mounted in said core transversely of said flux path, said wafer comprising a first layer of nonmagnetic material, a second layer of magnetic material, a third layer of nonmagnetic material, a fourth layer of magnetic material, and a fifth layer of nonmagnetic oxide, said first layer having a width greater than said fifth layer, said second layer having a width greater than said first layer, said third layer having a width substantially equal to the geometric mean of the widths of said first and fifth layers, and said fourth layer having a width greater than said third layer.

7. A magnetic transducing assembly for recording information signals onto a movable magnetic medium comprising: a magnetic core having at least three spaced apart non-magnetic gaps each having a trailing edge; said gaps having widths G1, G2 and G3 respectively; the distance from said trailing edge of said first gap to said trailing edge of said third gap governed by the relationship $C=G1+G2+G2+G3$, where C is the distance from the trailing edge of said first gap to said trailing edge of said last gap.

References Cited in the file of this patent

UNITED STATES PATENTS

| | | |
|---|---|---|
| 2,596,912 | Nygaard | May 13, 1952 |
| 3,070,670 | Eldridge et al. | Dec. 25, 1962 |

FOREIGN PATENTS

| | | |
|---|---|---|
| 1,218,317 | France | May 10, 1960 |
| 760,871 | Great Britain | May 13, 1952 |